(12) United States Patent
Miller et al.

(10) Patent No.: US 7,914,349 B2
(45) Date of Patent: Mar. 29, 2011

(54) CONNECTION CLAMP FOR BOTH TOP POST AND SIDE TERMINAL BATTERY CONTACT

(75) Inventors: Garret Miller, Owatonna, MN (US); Surender Makhija, Brookfield, WI (US); Scott Opsahl, Lakeville, MN (US); Robert Jensen, Clarks Grove, MN (US)

(73) Assignee: SPX Corporation, Charlotte, NC (US)

( * ) Notice: Subject to any disclaimer, the term of this patent is extended or adjusted under 35 U.S.C. 154(b) by 112 days.

(21) Appl. No.: 12/269,934

(22) Filed: Nov. 13, 2008

(65) Prior Publication Data

US 2010/0115761 A1  May 13, 2010

(51) Int. Cl.
*H01R 4/48* (2006.01)
(52) U.S. Cl. .................. 439/759; 439/822; 439/829
(58) Field of Classification Search .................. 439/759, 439/829, 835, 822, 506, 729
See application file for complete search history.

(56) References Cited

U.S. PATENT DOCUMENTS

| | | | |
|---|---|---|---|
| 2,037,834 A | 4/1936 | Sutherland | |
| 2,412,932 A | 12/1946 | Williams | |
| 3,641,473 A | 2/1972 | Attaway | |
| 4,643,511 A | 2/1987 | Gawlik et al. | |
| 4,758,188 A | 7/1988 | Yates | |
| 4,826,457 A * | 5/1989 | Varatta | 439/755 |
| 4,854,901 A | 8/1989 | Vernachio | |
| 4,923,415 A | 5/1990 | Lee | |
| 4,964,819 A | 10/1990 | Caraballo | |
| 6,238,253 B1 | 5/2001 | Qualls | |
| 7,029,338 B1 | 4/2006 | Orange et al. | |
| 7,530,857 B2 | 5/2009 | Domps | |
| 7,736,201 B2 * | 6/2010 | Gathman et al. | 439/759 |
| 2009/0247020 A1 * | 10/2009 | Gathman et al. | 439/759 |
| 2009/0311919 A1 * | 12/2009 | Smith et al. | 439/759 |

* cited by examiner

*Primary Examiner* — Edwin A. Leon
*Assistant Examiner* — Vanessa Girardi
(74) *Attorney, Agent, or Firm* — Baker & Hostetler LLP

(57) ABSTRACT

A single battery connection device that allows for connection both to a battery post and to a battery side terminal. Regardless of whether the device is connected to the battery post or side terminal, the device may be used as part of a four-point Kelvin connection to the battery. Also, a method of connecting to either to a battery post or to a battery side terminal using a single device.

16 Claims, 3 Drawing Sheets

CONNECTION CLAMP FOR BOTH TOP POST AND SIDE TERMINAL BATTERY CONTACT

FIELD OF THE INVENTION

The present invention relates generally to systems and devices used to connect to batteries. The present invention also relates generally to methods of connecting to batteries.

BACKGROUND OF THE INVENTION

Currently available vehicular batteries (i.e., batteries commonly found in today's automobiles, marine vehicles, industrial machinery, motorcycles, agricultural equipment, etc.) are typically either equipped with battery posts or battery side terminals. These posts and side terminals allow for connection to the anode and cathode of each battery by an exterior device (e.g., a battery tester, a battery charger, etc.).

Typically, devices that are electrically connected to battery posts utilize either clothespin-style connectors that clamp on to each post or ring-style connectors that are slid onto the posts and subsequently tightened about the posts using screws. On the other hand, devices that are electrically connected to battery side terminals typically utilize adapters in the form of pins or rods that are partially inserted into the side terminals. In many cases, the adapters are screwed into the side terminals to provide an electrical connection.

In view of the above, those tasked with the diagnosis, maintenance, repair and/or replacement of a large number of batteries on a regular or semi-regular basis invest both in clothespin-style connectors and in adapters for connecting to battery side terminals. They also keep track of where both the connectors and adapters are located. Unfortunately, currently available adapters are relatively small, individual components that are not affixed to wires or other electrical leads or any other components until after they have been affixed to a battery terminal. As such, currently available adapters are relatively hard to locate (particularly in heavily utilized and relatively full toolboxes) and are highly prone to being misplaced. Also, these adapters are typically made of lead, which is a relatively soft material. Hence, currently available adapters are highly susceptible to getting damaged.

SUMMARY OF THE INVENTION

At least in view of the above, it would be desirable to provide novel battery connection devices that are capable of being connected both to battery posts and battery side terminals. It would also be desirable to provide novel battery connection devices that reduce the possibility of misplacing components necessary for attachment to battery side terminals. In addition, it would further be desirable to provide novel methods for connecting to both battery posts and battery side terminals utilizing the same device.

The foregoing needs are met, to a great extent, by one or more embodiments of the present invention. According to one such embodiment, a battery connection device is provided. The battery connection device includes a first fastener configured to connect to a battery post. The battery connection device also includes a second fastener configured to connect to a battery side terminal, wherein a portion of the first fastener is integrated with the second fastener.

In accordance with another embodiment of the present invention, a method of connecting to a battery is provided. The method includes obtaining a device that includes a first fastener configured to connect to a battery post and a second fastener configured to connect to a battery side terminal, wherein a portion of the first fastener is integrated with the second fastener. The method also includes connecting the device to a battery using one of the first fastener and the second fastener.

In accordance with yet another embodiment of the present invention, another battery connection device is provided. This other battery connection device includes means for electrically connecting to a battery post. In addition, this other battery connection device also includes means for electrically connecting to a battery side terminal, wherein a portion of the means for electrically connecting to the battery side terminal is integrated with the means for electrically connecting to the battery post.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
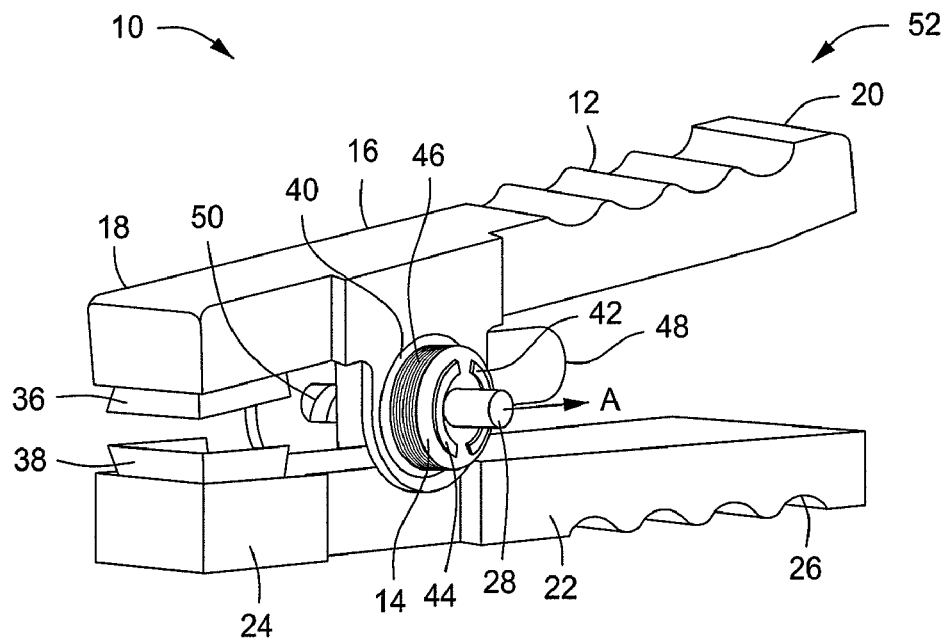
FIG. 1 is a perspective view of a first side of a battery connection device according to an embodiment of the present invention.
Figure 2:
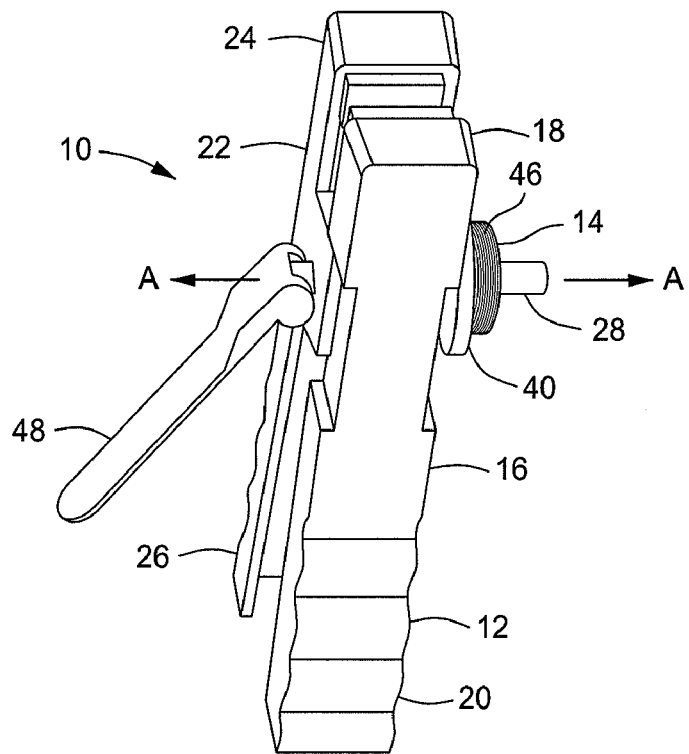
FIG. 2 is a perspective view of a second side of the battery connection device illustrated in FIG. 1.
Figure 3:
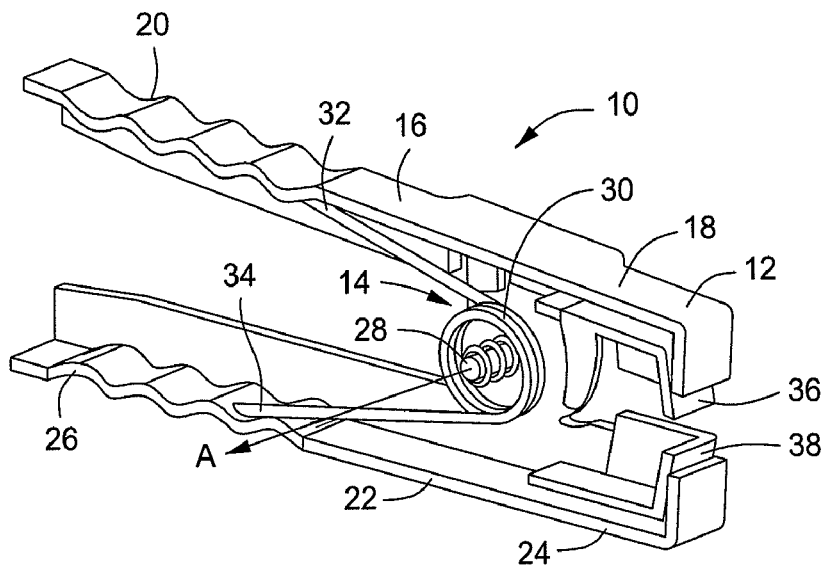
FIG. 3 is perspective view of a cross-section of the battery connection device illustrated in FIGS. 1 and 2.

The invention will now be described with reference to the drawing figures, in which like reference numerals refer to like parts throughout. FIG. 1 is a perspective view of a first side of a battery connection device 10 according to an embodiment of the present invention. FIG. 2 is a perspective view of a second side of the battery connection device 10 illustrated in FIG. 1. FIG. 3 is perspective view of a cross-section of the battery connection device 10 illustrated in FIGS. 1 and 2.

The battery connection device 10 illustrated in FIGS. 1-3 includes a first fastener 12 that is configured to be connected to a battery post (not illustrated) that protrudes from, for example, an automotive battery or the battery of a piece of industrial machinery. The battery connection device 10 also includes a second fastener 14 that is configured to be connected to a battery side terminal (not illustrated) that is included in, for example, a battery found in an automobile manufactured by General Motors (GM). As illustrated in FIGS. 1-3 and as will be discussed below, a portion of the first fastener 12 is integrated with the second fastener 14.

As illustrated in FIGS. 1-3, the first fastener 12 includes a first arm 16 having the illustrated length and width shown in the figure, a first forward portion 18 and a first rearward portion 20. The first fastener 12 also includes a second arm 22 having the length and width illustrated in FIGS. 1-3, a second forward portion 24 and a second rearward portion 26. A pin 28 extends through a portion of the first arm 16 and a portion of the second arm 22 along a hinge axis A-A that extends perpendicular to the first and second lengths.

As illustrated in FIG. 3, a spring 30 extends about a portion of the circumference of the pin 28 in an arcuate manner. As also illustrated in FIG. 3, the spring 30 has a proximate end 32 that contacts the first arm 16 and a distal end 34 that contacts the second arm 22. According to other embodiments of the present invention in the spring 30 may be replaced, for example, by a plurality of springs, a spring that winds multiple times about the pin 28 or any other mechanism that would apply a restorative force bringing the forward portions 18, 24 back together when they are moved apart pursuant to the rearward portions 20, 26 team squeezed together by, for example, a mechanic.

Also illustrated in FIGS. 1 and 3 are a first conductive component 36 that is connected to the first forward portion 18 and a second conductive component 38 that is connected to the second forward portion 24. Typically, the first and second conductive components 36, 38 are made from a highly conductive material such as, for example, copper. When the first fastener 12 is positioned about a battery post in such a manner as to be electrically connected thereto, the first and second conductive components 36, 38 make up two portions of a four-point Kelvin connection. By utilizing a second battery connection device (not illustrated) having a component equivalent to the first fastener 12 and attaching the component to a second battery post, a complete four-point Kelvin connection would be provided to diagnose a battery.

As illustrated in FIGS. 1-3, the second fastener 14 includes the above-discussed pin 28 that extends through a portion of the first fastener 12 (i.e., a portion of the first arm 16 and of the second arm 22). According to certain embodiments of the present invention, the pin 28 is configured to be at least partially inserted into a side terminal of a battery. Typically, the pin 28 is made from or at least includes a particularly strong and wear-resistant material such as, for example, steel. As such, the pin 28 provides substantially superior mechanical properties when compared to the lead components that had previously been used to provide connections to side terminals of batteries.

In order to prevent the pin 28 from becoming detached from the remainder of the first fastener 12 and/or battery connection device 10, a retention component 40 is included, as illustrated in FIGS. 1 and 2. According to certain embodiments of the present invention, the retention component 40 may be as simple as a washer or a geometric feature on one or both of the arms 16, 22. Also, according to certain embodiments of the present invention, the retention component 40 may be positioned about the pin 28 and between the portions of the first arm 16 and second arm 22 that are also positioned about the pin 28.

As illustrated in FIG. 1, the second fastener 14 includes a third conductive component 42 that is positioned radially about the longitudinal axis of the pin 28 (i.e., the A-A hinge axis). The second fastener 14 also includes a fourth conductive component 44 that is also positioned radially about the longitudinal axis of the pin 28. In FIG. 1, these conductive components 42, 44 are illustrated as arcuate in geometry. However, other geometries are also within the scope of the present invention.

Once the pin 28 has been inserted into the side terminal of a battery and the third and fourth conductive components 42, 44 are positioned adjacent to the side terminal, the third conductive components 42 and the fourth conductive component 44 can become portions of a four-point Kelvin connection. In order for this to occur, another device identical to the second fastener 14 is typically electrically connected to the other side terminal of the battery. According to certain embodiments of the present invention, the third and fourth conductive components 42, 44 are made from a highly conductive material such as, for example, copper. Since neither of the components 42, 44 protrude from the battery connection device 10, the components 42, 44 are not subjected to a high degree of force. As such, the conductive components 42, 44 are much less susceptible to breakage and/or wear than the lead components that had typically been used to connect to side terminals of batteries.

In order to secure the pin 28 and the third and fourth conductive components 42, 44 to the side terminal of a battery, the threaded portion 46 illustrated in FIGS. 1 and 2 may be used. More particularly, the threaded portion 46 may be screwed into a portion of a battery casing surrounding the side terminal. Once the threaded portion 46 has been properly screwed in and tightened with appropriate force, the electrical connection between the conductive components 42, 44 and the side terminal is typically better than that offered by currently used lead components.

In order to screw in and/or tighten the threaded portion 46 as discussed above, a lever arm 48 is provided as illustrated in FIGS. 1 and 2. According to certain embodiments of the present invention, the lever arm 48 is connected to the pin 28 and is configured to rotate about the hinge axis A-A. In addition, the lever arm 48 illustrated in FIGS. 1 and 2 may be folded against the arms 16, 22 or may have a portion thereof pulled away from the arms 16, 22.

As illustrated in FIG. 2, the end of the lever arm 48 that is physically connected to the pin 28 has a curved surface and two flat surfaces. According to certain embodiments of the present invention, this geometry provides a locking mechanism that is configured to prevent the lever arm from rotating about the hinge or longitudinal axis of the pin 28 when engaged. More specifically, upon examining FIG. 2, one of skill in the art will appreciate that it is substantially harder, if not impossible, to rotate the lever arm 48 when it is lying flat against the arms 16, 22. Because one of skill in the art will also appreciate that it takes a substantial amount of force to lift the lever arm 48 away from the arms 16, 22, the geometry of the lever arm 48 provides for the above-discussed locking mechanism.

Also illustrated in FIG. 1 is a second spring 50 that is wound around a portion of the pin 28. This second spring 50 is affixed to the pin 28 and at least one of the arms 16, 22. When the lever arm 48 is rotated in order to screw the threaded portion 46 into the casing of a battery, the second spring 50 gets compressed and promotes and/or facilitates contact between the pin 28 and the side terminal of the battery. One benefit of such an arrangement is that, even when the threaded portion 46 is over-tightened or under-tightened, the pin 28 pushes against the side terminal with substantially the same amount of force. Such substantially constant force generally improves the contact between the pin 28 and the side terminal of the battery and also minimizes the possibility of damaging the pin 28 and/or the side terminal of the battery.

Figure 4:
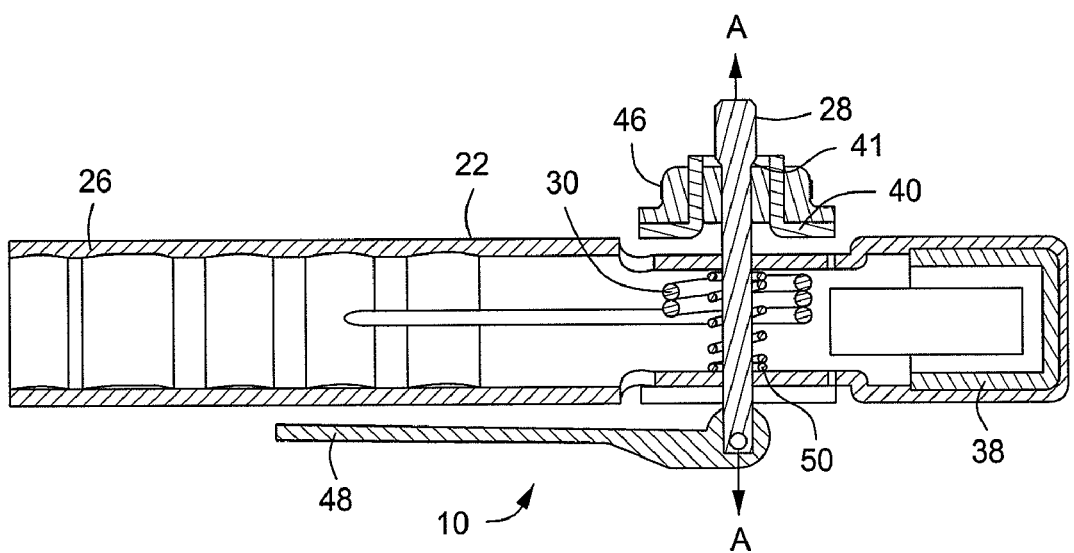
FIG. 4 is a top view of a cross-section of the battery connection device illustrated in FIGS. 1-3.

FIG. 4 is a top view of a cross-section of the battery connection device 10 illustrated in FIGS. 1-3. FIG. 4 enhances the clarity of the spatial relationships between the pin 28, the spring 30, the second spring 50, the retention component 40 and the remainder of the components in the battery connection device 10. FIG. 4 also illustrates how, according to certain embodiments of the present invention, a shoulder 41 is provided on the pin 28 near the threaded portion 46. Because the lever arm 48 is attached to the opposite end of the pin 28, the pin 28 is retained within the battery connection device 10 (i.e., is prevented from sliding out from between the first arm 16 and second arm 22.

Figure 5:
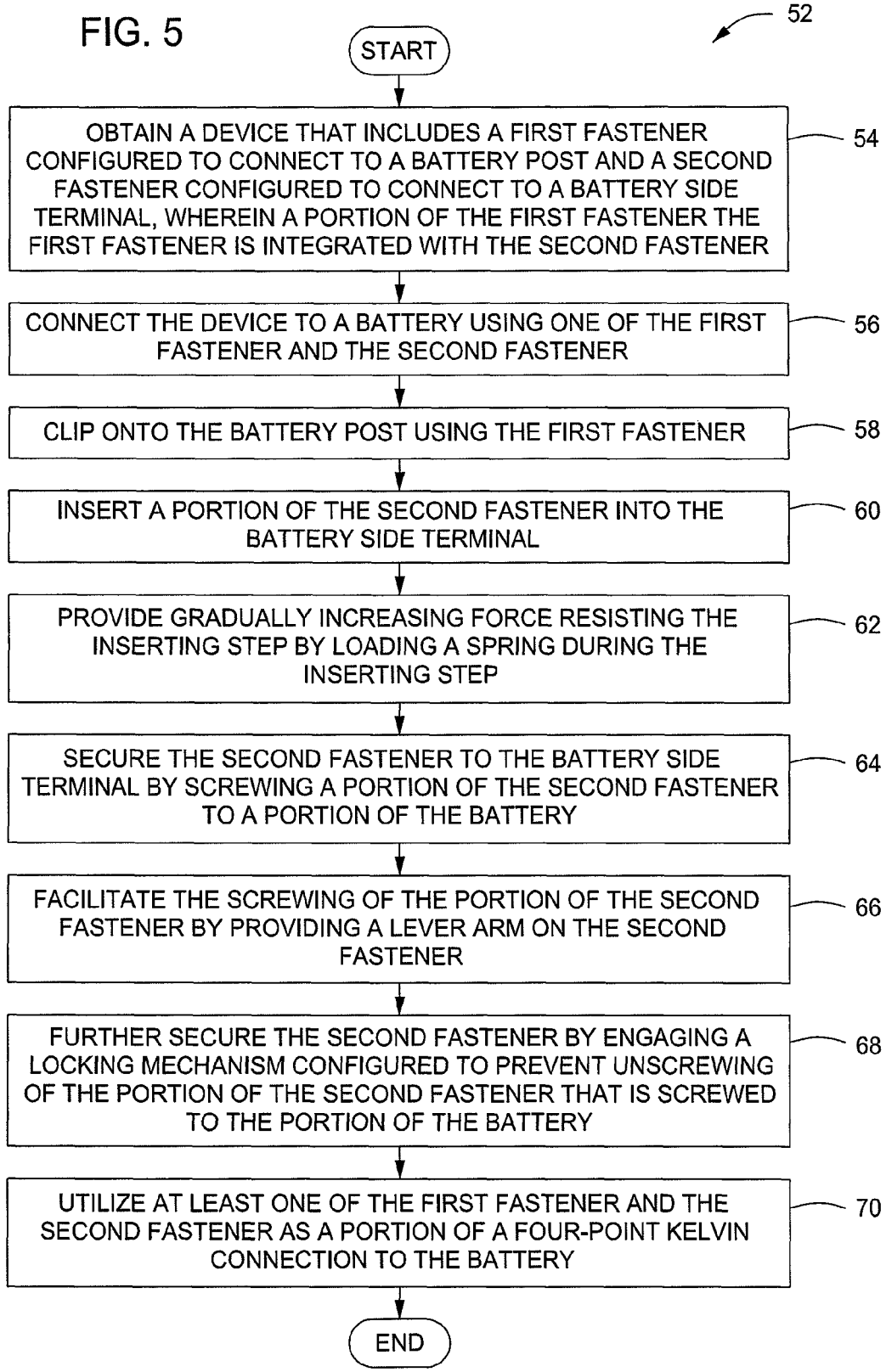
FIG. 5 is a flowchart illustrating the steps a method of method of connecting to a battery according to an embodiment of the present invention.

FIG. 5 is a flowchart 52 illustrating the steps of a method of connecting to a battery according to an embodiment of the present invention. According to step 54 of the method, a device is obtained that includes a first fastener (e.g., the above-discussed first fastener 12) that is configured to connect to a battery post. Step 54 also specifies that the device includes a second fastener (e.g., second fastener 14) configured to connect to a battery side terminal. In addition, step 54 specifies that a portion of the first fastener is integrated with the second fastener.

According to step 56 of the method, the device is connected to a battery using one of the aforementioned first fastener and a second faster. When using the above-discussed battery connection device 10, this step may be implemented by either clipping a battery post between the first arm 16 and the second arm 22 of the first fastener 12 as specified in step 58 or by inserting the pin 28 of the second fastener 14 at least partially into the side terminal of a battery as specified in step 60.

According to step 62, a gradually increasing force is provided to resist the inserting step by loading a spring during the inserting step 60. Step 62 may be implemented, for example, using the above-discussed second spring 50.

Step 64 next specifies securing the second fastener to the battery side terminal by screwing a portion of the second fastener to a portion of the battery. When implementing step 64 using the battery connection device 10, the threaded portion 46 is screwed into a portion of a battery casing.

Next, step 66 specifies facilitating the screwing of the portion of the second fastener by providing a lever arm on the second faster. As will be appreciated by one of skill in the art, step 66 may be implemented using the lever arm 48 discussed above.

According to step 68, the second fastener is further secured by engaging a locking mechanism that is configured to prevent the unscrewing of the portion of the second fastener that is screwed to the portion of the battery. When implemented using the battery connection device 10 discussed above, step 68 may be implemented by folding the lever arm 48 against the side of the first arm 16 and second arm 22.

The final step in method 52 (i.e., step 70) specifies utilizing at least one of the first fastener and the second fastener as a portion of a four-point Kelvin connection to the battery. Using battery connection device 10 illustrated in FIGS. 1-3, step 70 may be implemented using either first conductive component 36 and second conductive component 38 or third conductive component 42 and fourth conductive component 44.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A battery connection device, comprising:
   a first fastener configured to connect to a battery post;
   a second fastener configured to connect to a battery side terminal, wherein a portion of the first fastener is integrated with the second fastener wherein the second fastener includes a pin extending through a portion of the first fastener and configured to be at least partially inserted into a side terminal of a battery and a component configured to prevent the pin from becoming detached from the first fastener;
   a lever arm connected to the pin and configured to rotate about a longitudinal axis of the pin; and
   a locking mechanism configured to prevent the lever arm from rotating about the longitudinal axis of the pin when engaged.

2. The battery connection device of claim 1, wherein the first fastener comprises:
   a first arm having a first length, a first width, a first forward portion and a first rearward portion;
   a second arm having a second length, a second width, a second forward portion and a second rearward portion;
   a pin extending through a portion of the first arm and a portion of the second arm and along a hinge axis extending perpendicular to the first and second lengths; and
   a spring extending about a portion of a circumference of the pin in an arcuate manner, wherein a proximate end of the spring contacts the first arm and a distal end of the spring contacts the second arm.

3. The battery connection device of claim 2, further comprising:
   a first conductive component connected to the first forward portion; and
   a second conductive component connected to the second forward portion.

4. The battery connection device of claim 3, wherein the first conductive component and the second conductive component are portions of a four-point Kelvin connection.

5. The battery connection device of claim 1, further comprising:
   a first conductive component positioned radially about a longitudinal axis of the pin; and
   a second conductive component positioned radially about the longitudinal axis of the pin.

6. The battery connection of claim 5, wherein the first conductive component and the second conductive component are portions of a four-point Kelvin connection.

7. The battery connection device of claim 1, further comprising:
   a rotatable threaded portion connected to the pin.

8. The battery connection device of claim 1, further comprising:
   a spring positioned about a portion of the pin and configured to apply a force substantially parallel to a longitudinal axis of the pin when the spring is compressed.

9. A method of connecting to a battery, the method comprising:

obtaining a device that includes a first fastener configured to connect to a battery post and a second fastener configured to connect to a battery side terminal, wherein a portion of the first fastener is integrated with the second fastener;

connecting the device to a battery using one of the first fastener and the second fastener; and providing a gradually increasing force resisting the inserting step by compressing a spring during the inserting step, wherein the connecting step comprises:

inserting a portion of the second fastener into the battery side terminal.

10. The method of claim 9, wherein the connecting step further comprises:

clipping onto the battery post using the first fastener.

11. The method of claim 9, further comprising:

providing a gradually increasing force resisting the inserting step by compressing a spring during the inserting step.

12. The method of claim 9, further comprising:

utilizing at least one of the first fastener and the second fastener as a portion of a four-point Kelvin connection to the battery.

13. The method of claim 9, further comprising:

securing the second fastener to the battery side terminal by screwing a portion of the second fastener to a portion of the battery.

14. The method of claim 13, wherein the securing step further comprises:

facilitating the screwing of the portion of the second fastener by providing a lever arm on the second fastener.

15. A method of connecting to a battery, the method comprising:

obtaining a device that includes a first fastener configured to connect to a battery post and a second fastener configured to connect to a battery side terminal, wherein a portion of the first fastener is integrated with the second fastener;

connecting the device to a battery using one of the first fastener and the second fastener;

inserting a portion of the second fastener into the battery side terminal; and further securing the second fastener by engaging a locking mechanism configured to prevent unscrewing of the portion of the second fastener that is screwed to the portion of the battery.

16. A battery connection device, comprising:

means for electrically connecting to a battery post; and means for electrically connecting to a battery side terminal, wherein a portion of the means for electrically connecting to the battery side terminal is integrated with the means for electrically connecting to the battery post wherein the means for electrically connecting to a battery side terminal includes a pin extending through a portion of the means for electrically connecting to a battery post and configured to be at least partially inserted into a side terminal of a battery and a component configured to prevent the pin from becoming detached from the means for electrically connecting to a battery post;

a lever arm connected to the pin and configured to rotate about a longitudinal axis of the pin; and a means for locking configured to prevent the lever arm from rotating about the longitudinal axis of the pin when engaged.

* * * * *